Dec. 11, 1956 T. T. WATSON 2,773,302
PACK FOR MAKING ROLLED ALUMINUM CLAD PLATE
Filed June 21, 1951 2 Sheets-Sheet 1
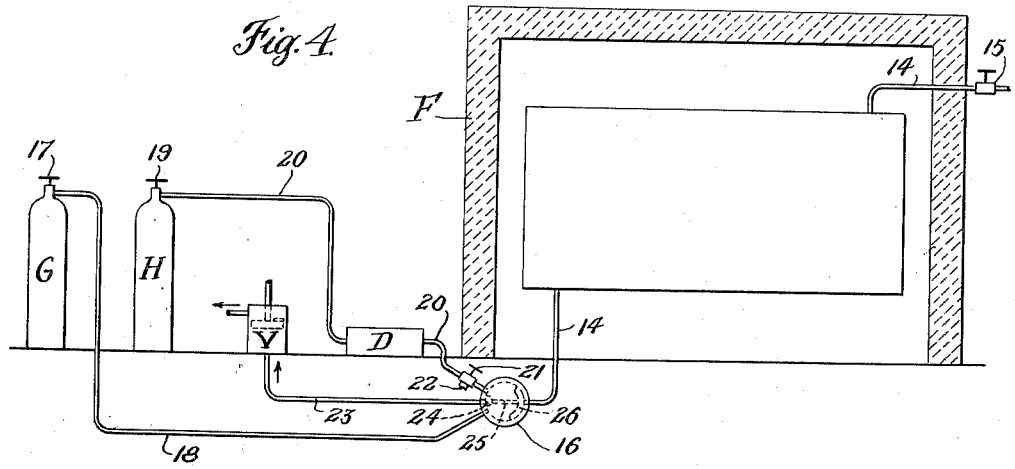
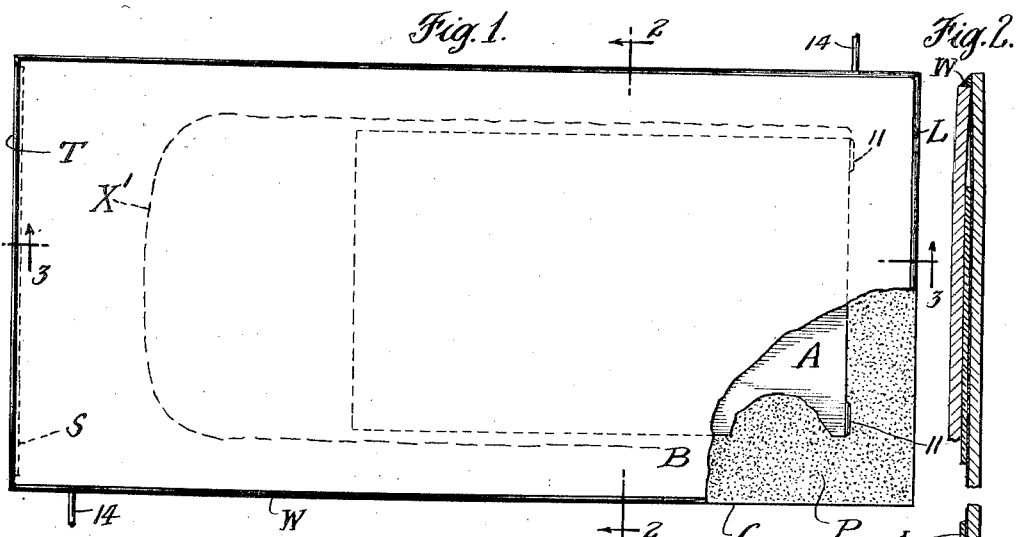
INVENTOR
Thomas T. Watson
BY
Sylvester & Lechner
ATTORNEYS Dec. 11, 1956   T. T. WATSON   2,773,302
PACK FOR MAKING ROLLED ALUMINUM CLAD PLATE
Filed June 21, 1951   2 Sheets-Sheet 2
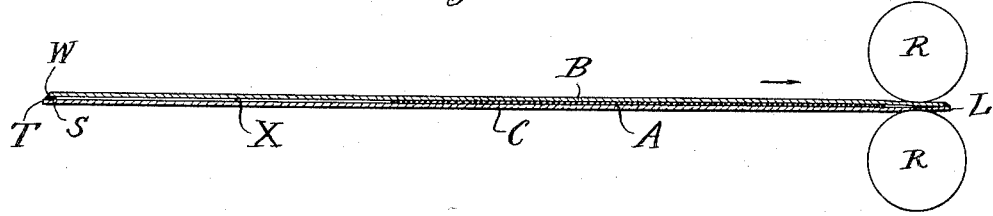
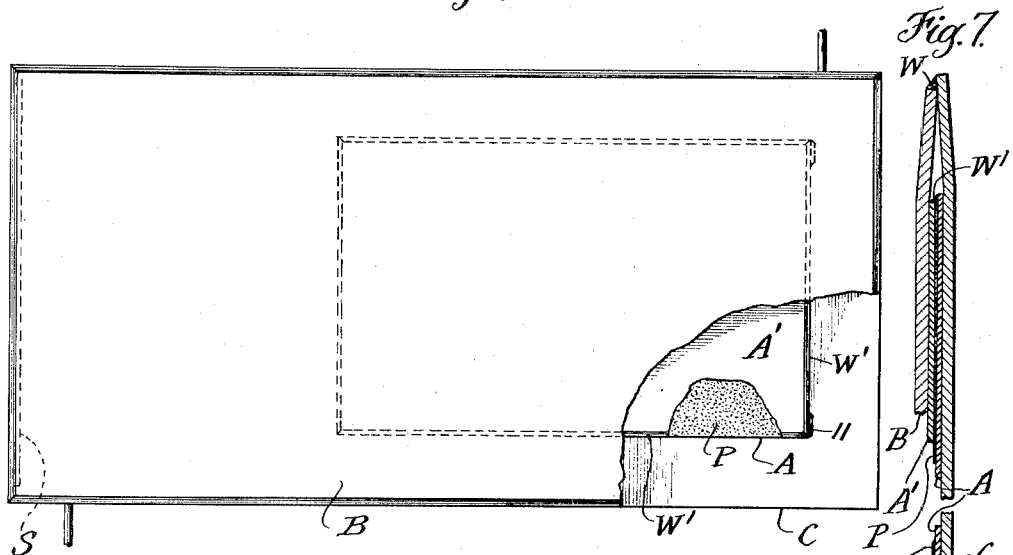
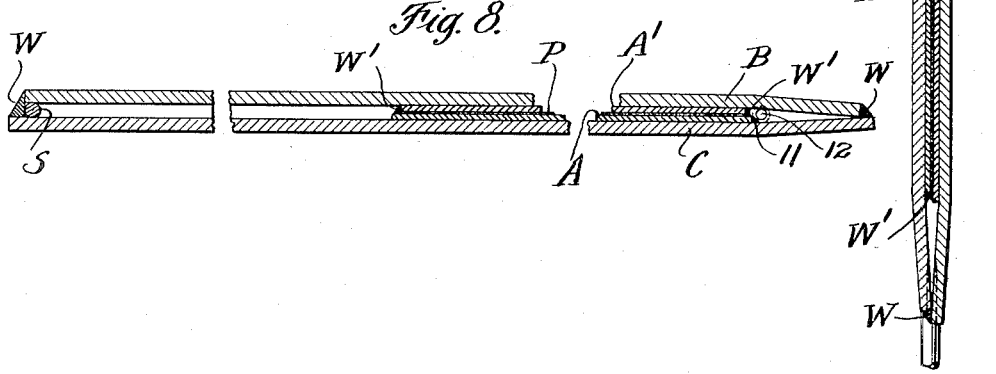

United States Patent Office 2,773,302
Patented Dec. 11, 1956

2,773,302

PACK FOR MAKING ROLLED ALUMINUM CLAD PLATE

Thomas T. Watson, Coatesville, Pa., assignor to Lukens Steel Company, Coatesville, Pa., a corporation of Pennsylvania Application June 21, 1951, Serial No. 232,818

3 Claims. (Cl. 29—196.2)

This invention relates to clad metal and the art of making it, and it comprehends a new type of pack and new methods of assembling and treating the pack to make the desired clad metal. The invention is more particularly concerned with aluminum-clad ferrous plate, and packs and processes especially advantageous in the production of such clad plate. By ferrous plate is meant ordinary carbon steel, various alloy steels, or other alloys wherein iron is a dominant element. By aluminum is meant not only aluminum itself but also any suitable alloy wherein aluminum is a dominant element.

In the clad metal art, various steels have been successfully clad with nickel, with stainless steel, and with other materials, and these have been produced and used commercially on a considerable scale. As for aluminum, it has long been known that it would be very desirable to produce aluminum-clad steel plates, and several processes have been proposed for producing them, but I know of none which has heretofore resulted in a satisfactory and uniformly bonded composite steel-and-aluminum article, still less such an article produced by a rolling process, with the ultimate product having a shear strength at the bond between strata equal at least to the shear strength of aluminum itself. This, among other things, is a major object which I have accomplished by my present invention, and in doing so I have devised novel methods of cladding ferrous plates and also novel packs or pack assemblies of wide utility.

Another object of my invention is the production of a pack, or pack assembly, for the making of clad metal, which will have special advantages in any clad metal manufacturing operation where the backing plate and/or the cover plate of the pack are of a relatively inextensible material under the designed rolling conditions, and the cladding or coating sheet or sheets are of a metal which is relatively readily extensible under said conditions.

Still further, the invention contemplates novel methods of producing clad metal, contributing toward uniformity, predictability, controllability, saving in cost of the process, minimum waste of material to be scrapped or re-worked, and the production of various clad metals wherein maximum use is made of the baser or less-expensive metals, and maximum economy is effected in the use of the nobler or more-expensive metals.

More specifically, the invention contemplates methods of assembling the sandwiches or packs from which clad metal may be made, and methods or processes of handling, treating or operating upon such packs for the production of clad metal by a rolling technique, which are of general advantage in the production of clad metals but of special advantage in the production of aluminum-clad ferrous plate.

Other objects and advantages of the invention will appear from the description of typical embodiments and practices hereinafter set forth, and still others will be apparent to those skilled in the art as being inherent in what is disclosed in the specification and drawings.

Figure 1 of the drawing is a plan view of a three-ply pack embodying certain features of the present invention and useful in the production of the final clad product of the invention, this view having certain portions of the upper and intermediate plies of the pack broken away to illustrate the assembly more clearly;

Figure 2 is a substantially enlarged sectional view on the line 2—2 of Figure 1, with portions broken out in order to condense the view;

Figure 3 is a similar longitudinal sectional view taken on the line 3—3 of Figure 1;

Figure 4 is a schematic view illustrating the pack coupled to sources of certain gases and a vacuum pump for carrying on certain steps of the method of this invention, this view also showing the furnace for heating the pack preparatory to rolling, although the only connection necessarily coupled to the pack while being heated is the hydrogen gas connection;

Figure 5 is a longitudinal sectional view of the heated pack shown at the beginning of the rolling operation; and Figures 6, 7 and 8 are views similar to views 1, 2 and 3 but illustrating a modified form of pack, of four-ply construction, adapted for the manufacture of two clad plates simultaneously.

By reference first to Figures 1 to 3, it will be seen that I have illustrated an elongated sheet A which, in the illustrative embodiment considered in detail hereinafter, is of aluminum, although for the making of other than aluminum-clad ferrous plate it may be of other materials readily extensible by the rolling process. This sheet is interposed between the main or backing plate B and the cover plate C, which are relatively non-yielding or inextensible under the rolling conditions imposed, and in the present embodiment are of carbon steel.

The two plates and the interposed sheet are generally oblong, being substantially elongated in the direction of rolling, i. e., from the leading end L of the pack to the trailing end T. It will be observed that the plates are of substantially greater area than the aluminum sheet, and are particularly of much greater length than the length of said sheet, and further that the center of area of the sheet A is much closer to the leading end of the pack than to the trailing end, so that in general the leading edge of said sheet is spaced from the leading edge of the pack only a moderate distance, for instance about 10" which is approximately the spacing between the side edges of the sheet and the side edges of the plates.

It will also be observed that the cover plate C is cut to slightly larger dimensions than the backing plate B, and that these are so disposed with reference to each other that a substantially uniform marginal surface of the cover plate is left initially exposed all along the periphery of the pack, for purposes of welding the pack together, in the manner hereinafter to be described.

In addition to the plates and the sheet, the pack includes a layer of parting compound P, hereinafter to be described, which is preferably painted upon the inner face of the cover plate C so as to prevent bonding of the aluminum sheet A to the cover plate.

In a typical example of the practice of my invention, assuming that the required final composite or stratified metal article is a 25% aluminum clad steel plate, 90 inches in length, 46 inches in width and ½ inch thick, the elements A, B and C of the pack may be as follows:

A is an aluminum sheet 72 inches by 44 inches, $\frac{3}{16}$ inch thick.

B is a carbon steel plate 113 inches by 59 inches, $\frac{3}{8}$ inch thick.

C is a carbon steel plate 114 inches by 60 inches, $\frac{3}{8}$ inch thick.

The treatment and assembly of the component elements of the pack, in this example, are typically as follows:

The surface of the plate B to which the aluminum sheet is to be bonded is grit-blasted, and the cover plate C is pickled to remove scale. The parting compound P, suitable to prevent bonding of the plate C to the aluminum sheet is then painted on the inner surface of plate C. One example of such parting compound is an aqueous suspension of graphite diluted with alcohol. A suitable compound, which is sold under the trademark "Dixonac," which comes in the form of a paste, may be mixed in the proportion of 6 ounces of such paste to 1 liter of alcohol, which makes sufficient parting compound for painting 40 square feet of surface. Although such graphite mixtures or suspensions have been heretofore used in association with cores and the like, in casting practice, I have found that they serve a special purpose and produce special advantages in the practice of the present invention, in that they provide something of a lubricating effect where a soft and readily extensible metal like aluminum is employed as the cladding material.

Other parting materials or compounds may be used, such as chromic oxide and aluminum oxide, but they are better adapted for use with other cladding metals, while the graphite mix has so far been found to be the best for use with aluminum.

After coating plate C with the parting compound, this plate is heated in a furnace at a temperature of approximately 500° F. for a period of about 30 minutes, in order to drive off some of the moisture and otherwise properly condition the coating for the subsequent steps.

The surfaces of the aluminum sheet A are cleaned with commercial carbon tetrachloride, and the bonding surface of the sheet is given a wire-brushing. Sheet A is then placed in the position on plate C shown in Figure 1. With the materials cut to the sizes given above, the area between the trailing edge of the sheet A and the trailing end T of the pack (either considered by itself, or in conjunction with the available area at each side of the sheet) may roughly bear the same proportion to the area of the sheet A as the intended reduction in thickness of the sheet bears to the final thickness of the aluminum cladding after the rolling operations. Thus, when the pack is rolled, the metal of sheet A may creep or extend out into the area referred to, and will at the same time be bonded to the plate B.

With the sheet A in the position shown in Figure 1, the leading edge of the sheet is fixed relative to other elements of the pack, for example by being tack welded as shown at 11, 11, to the cover plate C, this tack welding being preferably adjacent the leading corners of the sheet A, as shown. A suitable weld can be made by using "Everdur" No. 1010 filler rod, and the weld may be made by the "Heliarc" process. The backing plate B is placed on top of the sheet A (with its grit-blasted face against said sheet) and is evenly spaced with reference to the cover plate C, so as to leave the periphery of the latter exposed (in this instance to provide a ½ inch border) all around the edge of the pack.

There is of course a gap between the trailing areas of the two plates, equal to the thickness of the aluminum sheet. To maintain a uniform gap it is best to insert a spacer strip S. This may be in the form of a steel rod, in this example 3/16 inch in diameter, disposed transversely of the pack at the trailing edge of plate B. An aluminum spacer may be used, but in that case it should be positioned inwardly somewhat from the trailing edge of the pack, so as not to be affected by the following welding operation.

The leading and side edges of the plates of the pack are sprung together (as seen in Figs. 2 and 3), for example by clamping. The pack is then sealed by applying a fillet weld all around the periphery, as shown at W—this weld forming a juncture between the protruding peripheral surface of the plate C and the edge surfaces of plate B.

A hole is drilled or otherwise cut at points about 10 inches from each end of the pack, one at each side edge, one of these being shown at 12 in Figure 2. These holes must be drilled far enough in to be sure of communicating with the gap area shown at 13 between the plates. At these holes, steel pipes 14, 14 are welded in place. The pack is then pressure tested to insure that it is hermetically sealed. This is done by feeding argon gas into the pack and applying soap solution around the periphery of the pack. To insure that no air is left in the pack, argon gas is pumped in and released; and this is preferably done repeatedly, for example four or five times, and then the pack is evacuated with a vacuum pump. After evacuation the pack is preferably again filled with argon gas and the pipe connections closed, so that a positive gas pressure is maintained in the pack and therefore detrimental air is excluded.

When the pack is to be rolled, a connection is made from the source of hydrogen supply, and this may be done to either one of the pipes 14, and the other pipe may have its plug removed and replaced with a piece of wood. Alternatively, valved connections may be used, as hereinafter described. In either event, the line of connection from the hydrogen supply to the pack should first be flushed with hydrogen.

A convenient arrangement for treating and heating the sealed pack is schematically shown in Figure 4, wherein one of the pipes 14 is shown as provided with a controllable outlet valve 15 and the other pipe 14 is provided with a controllable inlet valve 16. A source of argon gas under pressure is indicated at G, this being connected through a controllable valve 17 and a pipe 18 to the valve 16. A source of hydrogen gas under pressure is indicated at H, this being connected through a controllable valve 19 and a pipe 20 to the valve 16. The pipeline 20 incorporates a gas-drying unit D containing activated alumina, and this pipeline further includes a controllable valve 21 having a vent port 22. A vacuum pump V is connected by pipe 23 to valve 16.

It will now be seen that the valve 16, by means of port 24, passage 25 and elongated port 26, may be used to connect any one of pipes 18, 20 and 23 to the inlet pipe 14 of the pack. By the unit D, the hydrogen gas is cleared of moisture, and by means of the valved vent port 22 the line from the source of hydrogen supply to the valve 16 may be flushed with hydrogen before the valve 16 is turned to deliver hydrogen into the pack from pipe 14.

When the pack is to be heated for rolling, it is charged into the furnace F, and during the heating cycle—preferably throughout the heating process—moisture-cleared hydrogen is injected slowly into the pack; in this example, at the rate of about 6 to 8 liters per minute, at approximately 40 pounds pressure.

The initial use of argon gas in clearing the pack of air is for the sake of safety in the plant—it being understood that hydrogen would, in other respects, do for that purpose, as well as for injection during the heating process. However, the use of hydrogen during the heating accomplishes several purposes, namely: it removes any air or gases that may remain in the pack; it removes gases that may be released from the iron during the heating of the pack; and it reduces any oxygen or oxides.

The heating of the pack in the furnace F is conducted slowly and uniformly to at least 900° F. or between that and a maximum of 1000° F. (when the cladding material is aluminum). The temperature of the pack for the actual rolling may be anywhere between 900° F. and 1000° F.—approximately 950° F. being the preferred temperature for cladding with aluminum. It is important that the temperature be high enough to promote a uniform bond between the aluminum and the steel plate but not so high as to cause the formation of an excessive quantity of the compound $FeAl_3$ at the bonding surfaces. This is a very brittle compound and is apt to be formed in detrimental quantities when aluminum and steel are bonded or welded together at temperatures exceeding 1000° F.

Stated in other terms, the temperature of the pack for rolling is above the usual temperatures employed for what is known as "cold" rolling of sheet, but considerably below temperatures ordinarily employed in the "hot" rolling of steel plate (ordinary temperatures for such hot rolling being in the neighborhood of 2300° F.).

As seen in Figure 5, the rolling of the pack between the rolls R is done by moving the pack in the direction of the arrow, i. e. so that the rolling effect is from the leading end L to the trailing end T; and where a plurality of passes are needed (and I have found that this is important if not essential in the aluminum cladding of steel), they should all be taken in the same direction. In the making of various clad plates heretofore known in the art, it has been customary to roll the pack in both directions, i. e. to take a reduction on each pass, but in accordance with the present invention it is important to take the reduction in one direction only. For multiple reductions by repeated rollings it is therefore important that the leading end L always enters the rolls first.

The rolling operation must be carefully controlled, and the amount of reduction that is made per pass is of considerable importance, especially in the case of aluminum cladding. In the example given in this specification, the maximum reduction per pass (for the three-ply pack) would be about .015 inch, and the total reduction of the 3/16 inch aluminum sheet would be 1/16 inch, so that four or five passes at least would be required.

The steel plates are not appreciably reduced in this rolling operation, the aluminum sheet being much more readily extensible, and the pressures employed at the rolls (with a temperature range of 900° F. to 1000° F.) being much less than would be required to appreciably reduce the thickness of the steel plates. With the leading ends of the plates sprung together and welded, there is initially, on the first pass, no pressure on the rolls as the end L of the pack enters the rolling mill. As the leading edge of the aluminum sheet approaches the point of contact of the rolls with the pack, there will of course be a compression of the pack and a reduction of the aluminum sheet, by an amount determined by the adjustment of the rolls. As the pack is advanced through the rolls, the sheet within the pack is extended into the space at X, and at the same time bonded to the surface of the backing plate. As the trailing end T of the pack passes through the rolls, the metal of the spacer strip S and the weld W is simply swaged out somewhat at the trailing end.

For most cladding purposes, even where a thinner sheet is employed than that hereinbefore described, the reduction per pass is preferably made less than one-half of the total desired reduction, so that multiple rolling is ordinarily employed in accordance with my process.

After the rolling has been completed, the pack is cooled, and in the case of the aluminum example herein used, it is allowed to cool gradually by the action of the surrounding air. When cooled, the pack is sheared around the edges so as to remove the cover plate; and finally the aluminum-clad plate itself may be sheared to the required pattern size. With reference to the shearing, it will be observed during the rolling that a "shadow" or the like shows up on the face of the pack approximately at the periphery of the extended sheet within the pack, and immediately upon the conclusion of the rolling, the limit of this extension into the area X may be marked on the surface of the pack, for example as indicated at X' in Figure 1. This serves as a guide to the operator when the time comes to shear the pack.

Turning now to Figures 6 to 8 inclusive, it will be seen that these views illustrate a four-ply pack, having in general the elements and make-up of the three-ply pack already described. The material differences between the two are as follows:

In the four-ply pack, two sheets of aluminum A and A' are employed. Sheet A is (as before) tack welded at 11 to the cover plate C, but there is no coating or parting compound interposed therebetween. Likewise there is no need to preheat the cover plate to 500° F., after such coating, since the layer of compound P is in this instance placed between the two aluminum sheets A and A', where it is confined (out of contact with the gases) by the welding together of the sheets A and A' around their peripheries as shown at W'—one of these sheets being cut slightly smaller than the other, as shown.

In the case of the four-ply pack, the overall maximum pack reduction per pass during rolling is kept down to not exceeding .015 inch for the two sheets together. The total reduction in rolling this pack (assuming that each aluminum sheet is 3/16 inch in original thickness) would be 1/8 inch maximum.

From the foregoing description it will now be clear to those skilled in the art that some of the major features and advantages of the invention reside in or flow from these facts that the cladding metal is the only layer which is being reduced to any appreciable extent; that the cladding metal, as it is extended, is bonded to the adjacent plate; that the cladding metal is secured to another element of the pack, but at one end only; that the rolling is always from that end (the leading end) to the other end (the trailing end) of the pack; that a free area for extension of the sheet is left adjacent the trailing end of the pack; that there is a springing together of certain edge areas (except at the trailing edge) prior to rolling, so that there is no appreciable pressure on the rolls at those regions; that the areas of the plates are different and the fillet weld is thus so arranged as to avoid excessive roll pressure; that the filler piece maintains the proper gap in the trailing area of the pack, thus permitting the free extension of the cladding sheet; that the extension of the cladding material is facilitated by the soft and lubricating nature of the graphite parting material; that the temperature range employed facilitates good bonding but prevents formation of brittle compounds and also avoids undesired reduction of the plates; that the inert gas techniques employed promote uniform and strong bonding; that the surface indication produced on the plate by the extension of the sheet during rolling acts as a gauge or guide for subsequent marking and trimming, which facilitates the latter operation and reduces loss of material; and that various of these features, and others described and illustrated, can be used advantageously in various combinations and sequences.

As to the strength of the bond in the ultimate product, it may here be noted that the A. S. M. E. has established a shear test for determining the bond strength of clad steels. A series of such tests on aluminum-clad plates made in accordance with the present invention show shear strength values not only as great as but actually greater than the shear strength of the aluminum itself. This is considered the optimum condition in clad steels.

The usefulness of the aluminum-clad steel final product will be apparent from the fact that aluminum has a much lower tensile strength than normal carbon steel but has much better corrosion resistance than carbon steel in many commercial applications. The tensile strength of aluminum further falls off sharply at high temperatures whereas that of carbon steel is only slightly affected, so that an aluminum-clad steel is of especial advantage in the construction of pressure vessels operated at elevated temperatures, particularly where resistance to corrosion requires the use of aluminum as a lining or facing for the vessel in order that the vessel may resist corrosion substances to which it is subjected in use.

It is to be noted that in practicing the process of this invention, the pack is rolled in one direction only and by this is meant that the lead end of the pack always enters the mill first. For example, the pack is placed on the south side of the mill and a reduction pass is made going from south to north and no rolling is done in moving the pack from north to south, and therefore, the lead end of the pack always enters the mill first. As is well known, the normal method of rolling is to take a reduction pass in both directions and each pass or reduction is made with the lead end entering the mill and then a further reduction is taken when the pack is reversed and the trailing end enters the mill first. To repeat, the present process takes a reduction pass in only one direction and after the first reduction, the rolls of the mill are raised and the pack passed back to its original location without any reduction and the cycle is repeated with the lead end entering the mill first until rolling is completed.

I claim:

1. A pack for making rolled aluminum clad plate, said pack being rectangular in shape and having a leading edge and a trailing edge considered with relation to a rolling operation in which all of the passes are made in the same direction, said pack comprising a pair of rectangular steel plates, one of said plates being larger than the other and symmetrically arranged thereover with its edges extending beyond and uniformly spaced from the corresponding edges of the other plate, a rectangular aluminum sheet between said plates, one of said plates and said sheet having juxtaposed faces in contact with each other, a coating of parting material between the other face of said sheet and the adjacent face of the other plate to prevent bonding of said sheet to the other plate, said plates forming the outside layers of said pack and said sheet having an area substantially less than the area of either of said plates and having its edges spaced inwardly from the edges of said plates, said sheet being nearer the leading edge of said pack than the trailing edge to form a relatively large space between said sheet and the trailing edge of said pack to receive a substantial portion of said sheet as it is extended thereinto under the pressure of a rolling operation, the corners of said sheet adjacent the leading edge of said pack being tack welded to the larger plate to prevent bodily shifting of said sheet with respect to said plates, the portions of said plates adjacent the sides of leading edge of said pack being inclined toward and into contact with each other, and a continuous weld hermetically sealing the edges of said plates.

2. A pack for making rolled aluminum clad plates, said pack being rectangular in shape and having a leading edge and a trailing edge considered with relation to a rolling operation in which all of the passes are made in the same direction, said pack comprising a pair of rectangular steel plates, one of said plates being larger than the other and symmetrically arranged thereover with its edges extending beyond and uniformly spaced from the corresponding edges of the other plate, a pair of rectangular aluminum sheets arranged with their inner faces in juxtaposed relation between said plates, one of said sheets being larger than the other and being symmetrically arranged thereover with its edges uniformly spaced from and extending beyond the corresponding edges of the other sheet, a coating of parting compound between said sheets, a continuous weld connecting and hermetically sealing the edge portions of said sheets together, the corners of said larger sheet adjacent the leading edge of said pack being tack welded to said larger plate to prevent bodily shifting of said sheets with respect to said plates during the rolling operation, the area of said larger sheet being substantially less than the area of either of said plates and having its edges spaced from the edges of said plates, said sheets being nearer the leading edge of said pack than the trailing edge to form a relatively large space between said sheets and said trailing edge of said pack to receive a substantial portion of said sheets as they are extended thereinto under the pressure of a rolling operation, the portions of said plates adjacent the sides and leading edge of said pack being inclined toward and into contact with each other, and a continuous weld hermetically sealing the joint between the edges of said plates.

3. A pack for making rolled aluminum clad plates, said pack being rectangular in shape and having a leading edge and a trailing edge considered with relation to a rolling operation in which all of the passes are made in the same direction, said pack comprising a pair of rectangular steel plates, one of said plates being larger than the other and symmetrically arranged thereover with its edges extending beyond and uniformly spaced from the corresponding edges of the other plate, a pair of rectangular aluminum sheets arranged with their inner faces in juxtaposed relation between said plates, one of said sheets being larger than the other and being symmetrically arranged thereover with its edges uniformly spaced from and extending beyond the corresponding edges of the other sheet, a coating of parting compound between said sheets to prevent bonding of said sheets together, a continuous weld connecting and hermetically sealing the edge portions of said sheets together, said weld being located within the fillet formed by that portion of said larger sheet which extends beyond the edges of said other sheet, the corners of said larger sheet adjacent the leading edge of said pack being tack welded to said larger plate to prevent bodily shifting of said sheets with respect to said plates during the rolling operation, the area of said larger sheet being substantially less than the area of either of said plates and having its edges spaced from the edges of said plates, said sheets being nearer the leading edge of said pack than the trailing edge to form a relatively large space between said sheets and said trailing edge of said pack to receive a substantial portion of said sheets as they are extended thereinto under the pressure of a rolling operation, the portions of said plates adjacent the sides and leading edge of said pack being inclined toward and into contact with each other, a spacer between said plates at the trailing end of said pack, and a continuous weld hermetically sealing the joint between the edges of said plates.

References Cited in the file of this patent

UNITED STATES PATENTS

| | | |
|---|---|---|
| 1,667,787 | Jaeger | May 1, 1928 |
| 1,956,818 | Acre | May 1, 1934 |
| 2,018,725 | Johnson | Oct. 29, 1935 |
| 2,059,584 | Johnson | Nov. 3, 1936 |
| 2,074,352 | Armstrong | Mar. 23, 1937 |
| 2,082,622 | Fink | June 1, 1937 |
| 2,093,814 | Mann | Sept. 21, 1937 |
| 2,159,043 | Orr | May 23, 1939 |
| 2,160,558 | Orr | May 30, 1939 |
| 2,199,321 | Ostendorf | Apr. 30, 1940 |
| 2,284,504 | Wrighton et al. | May 26, 1942 |
| 2,325,126 | Giesler | July 27, 1943 |
| 2,416,400 | Mehl | Feb. 25, 1947 |
| 2,421,891 | Keene | June 10, 1947 |
| 2,423,811 | Goulding | July 8, 1947 |
| 2,473,712 | Kinney | June 21, 1949 |
| 2,484,118 | Reynolds | Oct. 11, 1949 |
| 2,490,549 | Schultz | Dec. 6, 1949 |
| 2,537,207 | Carlson | Jan. 9, 1951 |
| 2,539,247 | Hensel | Jan. 23, 1951 |

FOREIGN PATENTS

| | | |
|---|---|---|
| 210,377 | Switzerland | Sept. 16, 1940 |
| 616,798 | Great Britain | Jan. 27, 1949 |
| 628,197 | Great Britain | Aug. 4, 1949 |